United States Patent
Chen et al.

(10) Patent No.: US 8,072,157 B2
(45) Date of Patent: Dec. 6, 2011

(54) CIRCUIT FOR DRIVING LED

(75) Inventors: Xiao-Zhu Chen, Shenzhen (CN); Hung-Yi Wu, Taipei Hsien (TW); Lei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 389 days.

(21) Appl. No.: 12/494,287

(22) Filed: Jun. 30, 2009

(65) Prior Publication Data

US 2010/0277086 A1 Nov. 4, 2010

(30) Foreign Application Priority Data

Apr. 29, 2009 (CN) .......................... 2009 1 0301983

(51) Int. Cl.
*H05B 37/02* (2006.01)

(52) U.S. Cl. ..................... 315/291; 315/246; 315/209 R

(58) Field of Classification Search .................. 315/247, 315/246, 224, 185 S, 209 R, 291–323
See application file for complete search history.

(56) References Cited

U.S. PATENT DOCUMENTS

| | | | | |
|---|---|---|---|---|
| 6,667,583 B2 * | 12/2003 | Kerenyi | ......................... | 315/219 |
| 7,583,035 B2 * | 9/2009 | Shteynberg et al. | .......... | 315/307 |
| 8,013,538 B2 * | 9/2011 | Zampini et al. | ............... | 315/291 |

* cited by examiner

*Primary Examiner* — James H Cho
(74) *Attorney, Agent, or Firm* — Altis Law Group, Inc.

(57) ABSTRACT

A circuit for driving a light emitting diode (LED), the circuit includes a timer, first to third electronic switches, and a regulator. The timer provides a pulse signal to switch the first and second electronic switches. The first electronic switch provides a first level signal to one end of the LED. The second electronic switch switches the third electronic switch on and off. The third electronic switch provides a third level signal to another end of the LED. The regulator adjusts the pulse signal to be at a predetermined frequency to control the first, second, and the third level signals to alternate between a high voltage level and a low voltage level at the predetermined frequency. The LED is driven to be on and off at the predetermined frequency by the first and third level signals.

13 Claims, 1 Drawing Sheet

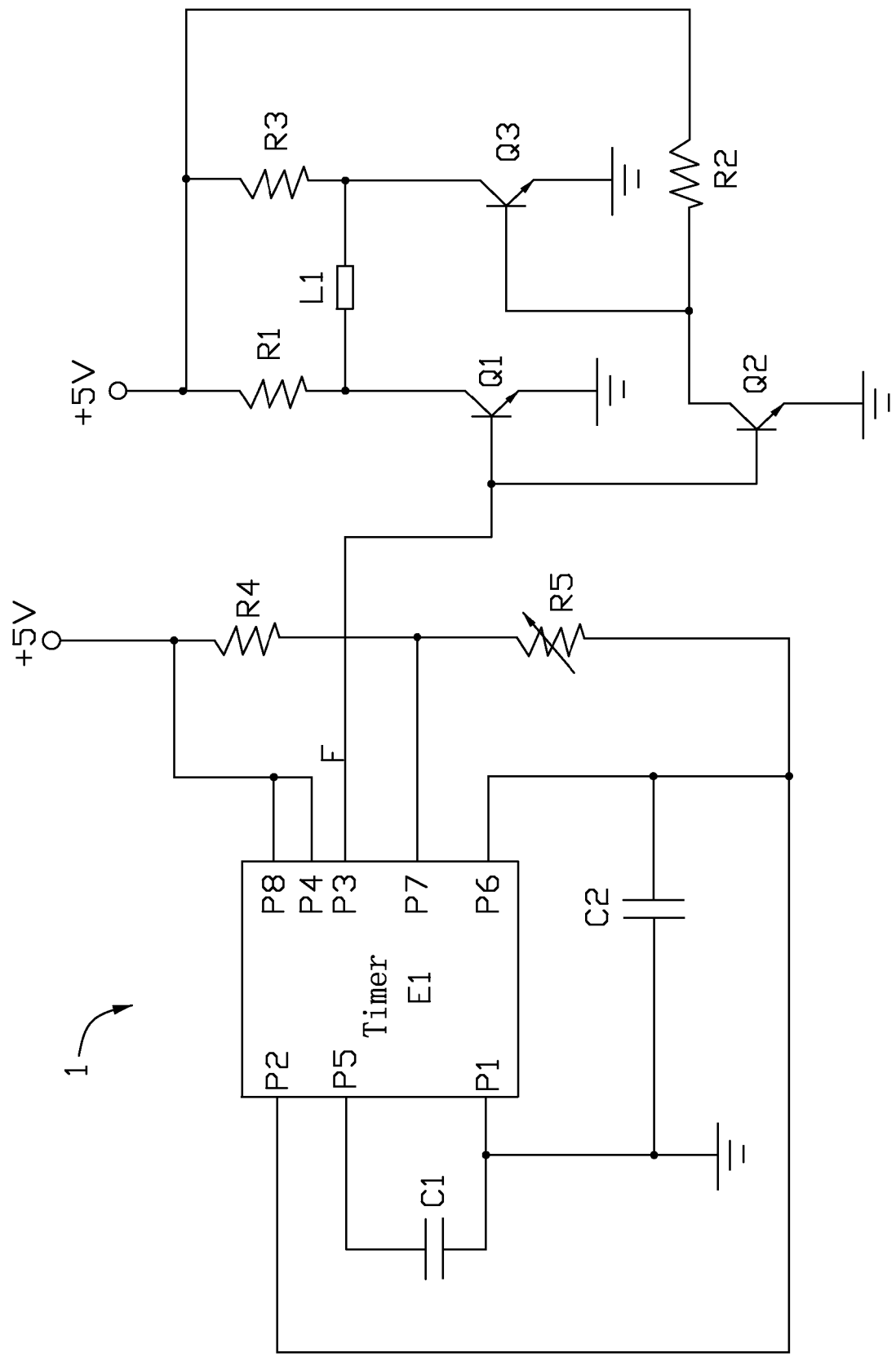

CIRCUIT FOR DRIVING LED

BACKGROUND

1. Technical Field

The present disclosure relates to driving circuits, and more particularly to a circuit for driving a light emitting diode (LED).

2. Description of Related Art

Light emitting diodes (LEDs) are widely used to indicate status of electronic devices by emitting light. Each LED can be driven to emit light when an anode of the LED receives a high level voltage signal, and a cathode of the LED receives a low level voltage signal. However, the LED will not work if the polarity is reversed.

BRIEF DESCRIPTION OF THE DRAWING

The drawing is a circuit diagram of an embodiment of a driving circuit of a light emitting diode.

DETAILED DESCRIPTION

Referring to the drawing, an embodiment of a circuit 1 for driving a light emitting diode (LED) L1 includes a timer E1, a regulator R5, three electronic switches Q1-Q3, two capacitors C1 and C2, and four resistors R1-R4. The regulator comprises a variable resistor. The timer E1 includes a grounded terminal P1, a triggering terminal P2, an output terminal P3, a reset terminal P4, a controlling terminal P5, a threshold terminal P6, a discharging terminal P7, and a power terminal P8.

Each of the electronic switches Q1-Q3 are a common emitter transistor and includes a gate, an emitter, and a collector. The electronic switches Q1, Q2 are connected in series, with a common input supplied to the gates of the electronic switches Q1 and Q2. The gate of the electronic switch Q3 is connected to the collector of the electronic switch Q2. The collector of the electronic switch Q1 is connected to a 5V power supply via the resistor R1. The collector of the electronic switch is connected to the 5V power supply via the resistor R2. The collector of the electronic switch is connected to the 5V power supply via the resistor R3. The emitters of the electronic switches Q1-Q3 are grounded. The resistors R1-R3 function as current limiters. The LED L1 is connected between the collectors of the electronic switches Q1 and Q3.

The reset terminal P4 and the power terminal P8 are connected to the 5V power supply. The capacitor C1 is connected between the controlling terminal P5 and the grounded terminal P1. The capacitor C2 is connected between the grounded terminal P1 and the threshold terminal P6. The triggering terminal P2 is connected to the threshold terminal P6. The variable resistor R5 and the resistor R4 are connected in series between the power supply and the threshold terminal P6. The discharging terminal P7 is connected to a node between the resistor R4 and the regulator R5. The output terminal P3 of the timer E1 is connected to the common input of the electronic switches Q1 and Q2.

The output terminal P3 of the timer E1 outputs a pulse signal at a frequency F. The pulse signal is supplied to the gates of the electronic switches Q1 and Q2. The frequency F of the pulse signal is determined by a capacitance of the capacitor C2 and resistances of the resistor R4 and the regulator R5 according to the following operational formula: $F=1.44/[(R4+2R5)*C2]$. The frequency F of the pulse signal is changeable by adjusting the regulator R5.

When the pulse signal is at a high voltage level, such as 3V, the electronic switches Q1 and Q2 are turned on. The electronic switch Q3 is turned off by receiving a low voltage level signal from the collector of the electronic switch Q2. The collector of the electronic switch Q1 outputs a low voltage level signal to a first end of the LED L1, and the collector of the electronic switch Q3 outputs a high voltage level signal to a second end of the LED L1.

When the pulse signal is at a low voltage level, such as 0V, the electronic switches Q1 and Q2 are turned off. The electronic switch Q3 is turned on by receiving a high voltage level signal from the collector of the electronic switch Q2. The collector of the electronic switch Q1 outputs a high voltage level signal to the first end of the LED L1, and the collector of the electronic switch Q3 outputs a low voltage level signal to the second end of the LED L1. The first and second ends of the LED L1 can be an anode and a cathode of the LED L1, respectively. In another embodiment, the first and second ends of the LED L1 can also be the cathode and the anode of the LED L1, respectively.

The LED L1 can be switched on and off at the frequency F by the pulse signal which alternates between the high and low voltage levels at the frequency F, regardless of polarity of the LED L1. The variable resistor R5 can be adjusted to make sure that the value of the frequency F is equal to or greater than 50 Hertz. When the value of the frequency F of the pulse signal is equal to or greater than 50 Hertz, the LED L1 turns on and off at a high rate, such as 50 times per second, so as to appear to be continuously on to the human eye. Because the LED L1 turns off and on so fast, people may think that the LED L1 is always emitting light. Therefore, the LED L1 can indicate status of an electronic device regardless of the direction of connections of the anode and the cathode of the LED L1.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A circuit for driving a light emitting diode (LED), the circuit comprising:
    a timer;
    a first electronic switch to provide a first voltage level signal to a first end of the LED in response to receipt of a pulse signal from the timer;
    a second electronic switch to output a second voltage level signal in response to receipt of the pulse signal;
    a third electronic switch to provide a third voltage level signal to a second end of the LED in response to receipt of the second level signal; and
    a regulator to adjust the pulse signal to be at a predetermined frequency to switch the first, second, and the third electronic switches on and off at the predetermined frequency, therefore to switch each of the first and third level signals to alternate between a high voltage level and a low voltage level at the predetermined frequency, wherein the LED is driven to be on and off at the predetermined frequency by the first and third voltage level signals.

2. The circuit of claim 1, further comprising a resistor, wherein the resistor and the regulator are connected in series between a power supply and a threshold terminal of the timer.

3. The circuit of claim 2, wherein the regulator is a variable resistor.

4. The circuit of claim 2, wherein a power terminal and a reset terminal of the timer are connected to the power supply, a triggering terminal of the timer is connected to the threshold terminal, a discharging terminal of the timer is connected to a node between the resistor and the regulator.

5. The circuit of claim 2, further comprising a first capacitor connected between a grounded terminal and the threshold terminal of the timer, and a second capacitor connected between a controlling terminal and the grounded terminal of the timer.

6. The circuit of claim 1, wherein the first and second electronic switches are connected in series to share a common input which receives the pulse signal.

7. The circuit of claim 6, wherein the first, second, and third electronic switches are common emitter transistors, a collector of each of the first, second, and third electronic switches is connected to a power supply via a current limiter.

8. The circuit of claim 7, wherein the common input is supplied to gates of the first and second electronic switches, the first, second, and third voltage level signals are outputted by collectors of the first, second, and third electronic switches correspondingly, the second voltage level signal is received by a gate of the second electronic switch.

9. The circuit of claim 7, wherein the current limiters are resistors.

10. The circuit of claim 1, wherein the first voltage level signal is provided to an anode of the LED, and the third voltage level signal is provided to a cathode of the LED.

11. The circuit of claim 1, wherein the first voltage level signal is provided to a cathode of the LED, and the third voltage level signal is provided to an anode of the LED.

12. The circuit of claim 1, wherein a value of the predetermined frequency is equal to or greater than 50 Hertz.

13. A circuit for driving a light emitting diode (LED) comprising an anode and a cathode, the circuit comprising:
   a timer to provide a pulse signal;
   a regulator to adjust the pulse signal to be at a predetermined frequency;
   a first electronic switch controlled by the pulse signal to provide a first level signal alternating between a high voltage level and a low voltage level at the predetermined frequency, wherein the first level signal is received by one of the anode and the cathode of the LED;
   a second electronic switch controlled by the timer to provide to output a second level signal alternating between the high voltage level and the low voltage level at the predetermined frequency; and
   a third electronic switch controlled by the second level signal to provide a third level signal alternating between the high voltage level and the low voltage level at the predetermined frequency, wherein the third level signal is received by the other one of the anode and the cathode of the LED.

* * * * *